(12) United States Patent
Jia et al.

(10) Patent No.: US 11,571,763 B2
(45) Date of Patent: Feb. 7, 2023

(54) GTAW SYSTEM AND WELDING METHOD FOR THICK PLATES WITH AN ULTRA-NARROW GAP

(71) Applicant: SHANDONG UNIVERSITY, Jinan (CN)

(72) Inventors: Chuanbao Jia, Jinan (CN); Wei Wu, Jinan (CN); Bin Wei, Jinan (CN); Sachin Mishra, Jinan (CN); Jihui Zhou, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 396 days.

(21) Appl. No.: 16/845,340

(22) Filed: Apr. 10, 2020

(65) Prior Publication Data

US 2020/0238417 A1 Jul. 30, 2020

Related U.S. Application Data

(63) Continuation of application No. PCT/CN2019/126482, filed on Dec. 18, 2019.

(51) Int. Cl.
*B23K 9/02* (2006.01)
*B23K 9/095* (2006.01)
(Continued)

(52) U.S. Cl.
CPC .......... *B23K 9/0213* (2013.01); *B23K 9/0953* (2013.01); *B23K 9/125* (2013.01);
(Continued)

(58) Field of Classification Search
CPC ........ B23K 9/296; B23K 9/167; B23K 9/125; B23K 9/164; B23K 9/0953; B23K 37/02; B23K 37/0282; B23K 37/0288
See application file for complete search history.

(56) References Cited

U.S. PATENT DOCUMENTS

| | | | | |
|---|---|---|---|---|
| 5,373,139 A | * | 12/1994 | Burgoon | B23K 9/164 219/136 |
| 2012/0061364 A1 | * | 3/2012 | Purslow | B23K 9/328 219/137.31 |

(Continued)

FOREIGN PATENT DOCUMENTS

| CN | 102896399 | * | 1/2013 | ............... B23K 9/02 |
|---|---|---|---|---|
| CN | 105312739 | * | 2/2016 | ............... B23K 9/28 |

*Primary Examiner* — Brian W Jennison
(74) *Attorney, Agent, or Firm* — CBM Patent Consulting, LLC

(57) ABSTRACT

A GTAW system and a welding method suitable for ultra-narrow gaps, and belongs to the technical field of narrow gap welding. The device includes a argon arc welding machine, a GTAW torch, a welding trolley, a wire feeding device, and a gas protection device. The GTAW torch includes a rotating motor, a rotating tungsten, a conductive system, and a gas supply system. The non-axisymmetric rotating tungsten is driven by the rotating motor through the central rotating shaft. The conductive system is used for connecting and supplying electric power from the argon arc welding machine, and the air supply system is used for providing shielding gas into the welding torch. The GTAW torch is fixed on the welding trolley, and the GTAW torch is moved by the welding trolley, and the wire feeding device moves synchronously with the welding torch.

18 Claims, 5 Drawing Sheets

(51) Int. Cl.
*B23K 9/12* (2006.01)
*B23K 9/16* (2006.01)
*B23K 37/02* (2006.01)
*B23K 9/235* (2006.01)
*B23K 9/29* (2006.01)
*B23K 37/00* (2006.01)
*B23K 9/167* (2006.01)

(52) U.S. Cl.
CPC .............. *B23K 9/164* (2013.01); *B23K 9/167* (2013.01); *B23K 9/235* (2013.01); *B23K 9/296* (2013.01); *B23K 37/003* (2013.01); *B23K 37/0211* (2013.01)

(56) References Cited

U.S. PATENT DOCUMENTS

| | | | | |
|---|---|---|---|---|
| 2013/0327755 | A1* | 12/2013 | Weiss | B23K 9/167 219/138 |
| 2015/0041446 | A1* | 2/2015 | Inoue | B23K 37/0241 219/124.31 |

* cited by examiner

GTAW SYSTEM AND WELDING METHOD FOR THICK PLATES WITH AN ULTRA-NARROW GAP

This application is a continuation application of International Application No. PCT/CN2019/126482 filed on 19 Dec. 2019 which designated the U.S. and claims priority to Chinese Application No. CN201911107175.1 filed on 13 Nov. 2019, the entire contents of each of which are hereby incorporated by reference.

FIELD OF INVENTION

The invention relates to a GTAW system and a welding method suitable for ultra-narrow gap, which belongs to the technical field of narrow gap welding.

BACKGROUND OF THE INVENTION

The narrow gap welding technology is a method for realizing high efficiency and high quality welding of thick plates by using a fully automatic welding device and arc control technology in a narrow gap. Narrow gap welding technology is commonly used in the welding of low-alloy steel thick-walled containers and some important alloy components. Compared with the traditional welding method, the narrow gap welding technology ensures high quality of the thick plate. Because the small angle gap is selected, the cross-sectional area of the gap is reduced by more than 50% compared with the traditional gap, which effectively reduces the welding cost of material. Moreover, the number of weld pass and the quality of the weld can be improved, thereby effectively reducing the residual stress and distortion of the workpiece.

Based on the narrow gap welding technology, the ultra-narrow gap welding technology has been gradually developed by further reducing the gap size and expanding the material cost saving advantage. The ultra-narrow gap welding technology refers to the case where the gap width reaches 6 mm or less. However, as the width of the gap is further reduced, the arc characteristics become so sensitive that the arc is unstable and likely to climb on the sidewall, burn on the sidewall, and burn the wire back. At present, the researchers use the flux strip or the flux sheet to restrain the arc to solve the above problems to some extent, but there are still some problems waiting to be taken into consideration that result in complications and difficulty to insure stable welding process. The non-axisymmetric rotating tungsten electrode narrow gap welding uses a non-axisymmetric tungsten electrode to control the periodic oscillation of the arc by rotating the tungsten electrode in the gap. The structure is simple and is less affected by the gap width, which can effectively solve some problems existing in ultra-narrow gap welding.

Invention Content

To solve the problems existing in the present technique, the invention provides a GTAW system suitable for ultra-narrow gap welding.

Moreover, the invention also provides a welding method applying to the above welding system.

The Technical Solution of the Present Invention is as Follows

The GTAW system is suitable for ultra-narrow gaps, comprising: argon arc welding power source, GTAW gun, welding trolley, wire feeding device and gas protection device.

The GTAW torch includes welding torch shell, rotating electric machine, central rotating shaft, rotating tungsten electrode, conductive system and air supply system. The rotating motor is connected to the rotating tungsten electrode through the central rotating shaft. The rotating tungsten electrode is a non-axisymmetric tungsten electrode. The conductive system is used to connect to and supply power to the argon arc welding power source. The air supply system is used to provide shielding gas into the welding torch. The rotating motor makes the tungsten electrode rotate periodically.

The GTAW torch is fixed on the welding trolley and moves with it.

The wire feeding device is mechanically connected to the GTAW torch and moves synchronously with the torch, with which users can change the wire feeding angle according to demand. The automatic wire feeding device matches the welding machine, realizing the delayed wire feeding, the wire drawing in advance and the adjustments of the wire feeding parameters during the welding process.

The gas protection device is a case that is disposed above the workpiece to be welded. There are a welding torch port and a gas inlet on the case, which are used to let the welding torch in and connected to the external shielding gas system.

The air supply system of the GTAW torch adopts the gas protection structure of the ordinary GTAW torch. After the gas enters the welding torch, it fills the air chamber inside the torch first and then it is sprayed through the ceramic nozzle after buffering, which plays a certain restraining effect on the arc under the tungsten electrode and protects the molten pool below the arc.

Preferably, the front end of the GTAW torch is provided with a ceramic nozzle, and the inner wall of the ceramic nozzle is machined with a spiral air guiding gap, which has a certain acceleration effect on the airflow, thus allowing the gas to reach a deeper part of the gap. During welding process, argon gas gently enters the case through the air inlet and forms an argon atmosphere after being dispersed to protect the weld area from oxidation after welding.

Preferably, the GTAW torch is fixedly connected to the welding trolley by a threaded bolt by which we can adjust the distance between the welding torch and the workpiece in the horizontal and vertical directions.

Preferably, the welding torch shell of the GTAW torch is made of aluminum alloy material in order to reduce the weight. In addition, the insulating bakelite is used in contact with the clamp to prevent the arc ignition high frequency from affecting the welding torch. The central rotating shaft is made of brass, which can reduce the weight of the welding torch and the axial load effectively. Moreover, the brass material meets the mechanical properties, thermal conductivity and electrical conductivity while providing high economic efficiency. The central rotating shaft is connected with the rotating tungsten electrode with electrically insulated deep gap ball bearings. They can effectively resist the influence of current on the bearing surface and lubricating oil while satisfying the coaxial rotation precision of the central rotating shaft, thus slowing down the corrosion rate of the bearing surface, enhancing the wear resistance of the bearing and prolonging the service life of the bearing.

Preferably, the end of the central rotating shaft is tightly threaded to the rotating tungsten electrode by a reverse wire. On the one hand, it guarantees good air tightness, on the other hand, it ensures that the thread becomes tighter and tighter during the rotation. During welding, the shielding gas flows through the torch to accelerate the heat dissipation speed of the central rotating shaft, the rotating tungsten electrode, and the conductive copper block.

Preferably, the bottom end of the rotating tungsten electrode is provided with an inclined surface. An angle is formed between the inclined surface and the central shaft of the rotating tungsten electrode. As the tungsten electrode rotates in the narrow gap periodically, the distance between the tungsten electrode tip and the two sidewalls changes periodically. According to the principle of minimum voltage, as the tungsten electrode rotates periodically, the arc sways in the narrow gap so that the welding wire and the sidewall are effectively melted.

Further preferably, the angle between the inclined surface and the central axis of the rotating tungsten electrode is 45°. According to the comparison test, when the tilt angle is too small, the arc shape is similar to that of the ordinary tungsten electrode, causing the sidewall on both sides of the narrow gap difficult to be effectively heated and poorly fused. When the tilt angle is too large, the arc length is too long and the arc stiffness is not enough, which is not conducive to the stable combustion of the arc. Generally speaking, it is best when the tip is at a 45° tilt angle.

Further preferably, the tip of the inclined surface of the rotating tungsten electrode is provided with a blunt platform. The tungsten electrode tip is processed out of the platform, which can effectively improve the stability of the arc. On the other hand, compared with the ordinary tungsten electrode, the processing of the platform can effectively improve the burning of the tungsten electrode during use.

Preferably, the rotating motor is coupled to the central rotating shaft via a coupling.

Preferably, the welding system further comprises a PC and a hardware control circuit. The rotating motor is connected to the PC, and the rotation frequency of the rotating tungsten electrode is controlled by the PC and the hardware control circuit to regulate the pulse frequency of the motor.

The pulse frequency of the stepping motor is controlled by the PC and the control circuit to control the acceleration and deceleration of the stepping motor. Each time a pulse is generated, the initial value of the timer is de creased by a value, the pulse period is decreased, the pulse frequency is increased, and the motor is in the acceleration phase. When entering the deceleration phase, the initial value of the timer is increased for each pulse generated. For one value, the pulse period increases and the pulse frequency decreases. By controlling the motor to output a periodic trigonometric waveform speed to control the non-uniform rotation of the tungsten electrode in the gap, the speed of the tungsten electrode tip is the slowest when it rotates to the sidewalls of the two sides, and the speed is the fastest when it rotates to the middle of the gap. This method increases the residence time of the arc on both sidewalls, which allows more heat in one arc swing period to heat the sidewalls.

Preferably, the housing is a hollow square housing, on the top of which the welding torch and the air passage opening are disposed.

Preferably, one end of the housing is connected to the GTAW torch by a slide bar. The housing can be adjusted along the slider and moved synchronously with the torch.

Preferably, a pad is arranged under the workpiece to be welded, and the pad is provided with a gas gap along the weld, and one end of the gas gap is connected with the external protective gas system. In addition to the gas protection device above the welded workpiece, the protective gas is also introduced under the workpiece to be welded. On the one hand, an argon atmosphere is formed to protect the back of the workpiece, and on the other hand, the heat dissipation and cooling of the weldment can be accelerated, and the welding efficiency is improved.

Further preferably, the back plate is made of brass.

Preferably, the wire feeding device comprises a wire feeding tube which is square in shape. Different from the conventional circular feeding tube, on the one hand, this design can reduce the size of the wire feeding tube in the direction of the vertical narrow gap and facilitate the movement of the wire feeding tube in the gap. On the other hand, it can facilitate the accurate feeding of the wire to the tungsten electrode, which prevents the wire from being inaccurately positioned in the ultra-narrow gap due to the axial rotation of the wire feeding tube during the adjustment.

Due to the gas protection device, the wire feeding tube needs to be bent into a certain curve to feed the wire into the gap so that the fed wire is also bent into a certain curve. Accurately positioning the wire feed tube in the middle of the gap, keeping the same surface with the tungsten electrode can improve the stability of the welding process and the formation of the weld.

A welding method using the above GTAW system suitable for ultra-narrow gaps, comprising the following steps:
(1) Pretreat the workpiece to be welded including processing and cleaning the workpiece to be welded;
(2) Turn on the welding trolley. When the rotating tungsten electrode moves into the gap of the workpiece, adjust the position of the rotating tungsten electrode to ensure that it is centered in the horizontal direction in the gap. The wire feeding tube extends from the front end of the gas protection device into the gap, and the wire protruding from the wire feeding tube is located directly below the tungsten electrode. Turn on the welding machine, adjust the welding machine to a constant current mode, deliver gas in advance, and delay the gas. Then adjust the movement speed of the welding trolley, adjust the wire feeding speed of the setting wire feeding machine, delay the wire feeding, and draw the wire in advance to prevent the wire melting from being poked into the molten pool during the welding process. Adjust the PC and set the average motor speed.
(3) After adjusting the parameters, the welding trolley is controlled to move out of the gap, and the rotating motor is turned on to make the rotating tungsten electrode start to rotate. When the welding trolley is moved to the edge of the gap, turn on the welding machine, the high frequency arc is ignited, and the wire feeding tube is used for wire feeding.

After the first layer of welding is completed, the argon gas delayed in the gas protection device is used for cooling, and then the step (2) is repeated for the next layer of welding.

Preferably, in step (2), the size of the rotating tungsten electrode and the position of the tungsten electrode are adjusted according to the size of the gap. In the horizontal direction of the vertical weld, the tungsten electrode is located at the middle of the gap to prevent the tungsten electrode from produce a large deviation when it moves to the sidewalls of the two sides.

The height of the tungsten electrode from the bottom gap is adjusted according to the gap size. The specific rules are as follows: To weld a 6 mm gap, a 3.0 mm tungsten electrode is used, the tip is processed with a 45° inclined surface and has a blunt platform, and the tungsten electrode tip is at a height from the bottom of 3.0 mm. To weld a 5 mm clearance gap, a 2.4 mm tungsten electrode is used, the tip is processed with a 45° inclined surface and has a blunt platform, the tungsten electrode tip is 2.6 mm from the bottom. To weld a 4 mm gap, 2.0 mm tungsten electrode is used, and the tip is processed with a 45° slope and has a blunt platform with a tungsten electrode tip that is 2.0 mm from the bottom.

Preferably, in step (2), the horizontal distance between the wire feeding tube and the rotating tungsten electrode is 5 mm.

Preferably, in the step (2), the tip of the rotating tungsten electrode has a vertical distance of 2-3 mm from the welding wire to ensure the stability of the welding process and the uniform formation of the weld.

Preferably, in the step (3), after the layer of welding is completed, the weld is cooled to a temperature of 45-55° C. by using the shielding gas, and then the step (2) is repeated for the next layer of welding.

Further preferably, in the step (3), after one layer of welding is completed, the weld is cooled to a temperature of 50° C. by using the shielding gas, and then the step (2) is repeated for the next layer of welding.

Preferably, in the step (3), in the next welding process, the welding current of the next layer increases compared with the former one, and the flow rate of the next layer of shielding gas decreases compared with the previous one.

Preferably, in the step (3), the rotating frequency of the rotating motor is controlled by the PC and the hardware control circuit to control the non-uniform rotation of the rotating tungsten electrode so that the heating time of the rotating tungsten electrode on the sidewall is half of one cycle of the rotation. A non-uniform swing of the arc is achieved. During the rotation of the tungsten electrode, arc is burning on both sidewalls for about one-third of the stage, and arc heats the wire and the molten pool in the middle of the gap for about the two-thirds of the stage. By controlling the non-uniform rotation of the tungsten electrode, the speed of the tungsten electrode tip decreases when it rotates to the sidewall of the two sides, and the speed increases when the middle of the gap is turned, so that the sidewall heating time changes from the original ⅓ cycle to the current ½ cycle during one rotation.

Moreover, the motor control circuit can be adjusted according to the needs of different gap sizes to adjust the ratio of the rotating speed, thereby adjusting the proportion of the arc heating sidewall time. On the one hand, the heat input can be effectively reduced, and on the other hand, the sidewall fusion is more reliable.

Further preferably, in step (2), as the gap width is reduced, in order to ensure that the sidewalls of both sides are well fused and the wire is melted in time without excessive heat input, it is necessary to increase the welding speed and the speed of the tungsten electrode rotation. The specific laws are as follows: to weld a gap of 6 mm, the average rotational speed of the tungsten electrode is adjusted to 4 rps; to weld a 5 mm one, the average rotational speed of the tungsten electrode is controlled to be 5 rps; to weld a 4 mm one, the average rotational speed of the tungsten electrode is 6 rps. The average speed of the tungsten electrode rotation is adjusted according to different sizes, and the contradiction between the excessive heat input and the poor fusion is solved.

Preferably, in step (3), there is a matching relationship between the wire feeding speed, the welding speed and the heat input. The wire feeding speed can be adjusted from 1000 mm/min to 1250 mm/min according to the needs, and the welding speed can be adjusted from 80 mm/min to 100 mm/min. The welding current and welding speed are adjusted to control the welding heat input in the interval from 2.0 kJ/mm to 2.5 kJ/mm to prevent the wire from being too fast to melt or being poked into the molten pool, affecting the stability of the welding process. The problem that wire speed is too small to supply sufficient deposited metal can be solved.

The Beneficial Effects of the Present Invention

The technical scheme of the invention realizes the welding of the thick plate and the thick plate by processing the U-shape gap of the 4-6 mm ultra-narrow gap, and further expands the advantage of the raw material saving compared with the narrow gap welding by effectively reducing the gap processing area. The deposition efficiency and the welding efficiency are increased while the heating input is decreased.

The technical scheme of the invention adjusts the dwelling time of each region of the arc in the ultra-narrow gap by periodically adjusting the rotational speed of the tungsten electrode, thereby adjusting the heat distribution at different positions. The arc has more time to heat the sidewall during one rotation period to ensure effective fusion of the sidewalls on both sides.

The technical scheme of the invention provides a three-way gas protection. A protective atmosphere is formed in the gas protection device in advance to form a protective atmosphere, and the gasket air tank is also ventilated to form a protective atmosphere environment. The intermediate gas passage is spirally accelerated by the inner wall of the ceramic nozzle of the GTAW torch before being sent into the ultra-narrow gap. The problem that the shielding gas cannot be effectively delivered to the bottom of the gap in the ultra-narrow gap can be effectively solved, and the stable combustion of the arc in the ultra-narrow gap can be ensured.

The technical solution of the invention reduces the burning loss of the tungsten electrode tip by processing the tungsten electrode into the non-axisymmetric tip with the platform while ensuring the periodic swinging and stable combustion of the arc in the ultra-narrow gap. The wire feeding device accurately positions the wire in the ultra-narrow gap, which can achieve the stable wire feeding of the thick plate welding.

The technical scheme of the invention drives the welding torch to move with the welding trolley, and the precise positioning of the welding torch and the tungsten electrode in all directions can be realized by the welding torch position adjusting device, thereby ensuring a stable welding process. According to different gap optimization parameters, all position welding of the thick plate with high quality and high efficiency can be realized.

DRAWINGS

Figure 1:
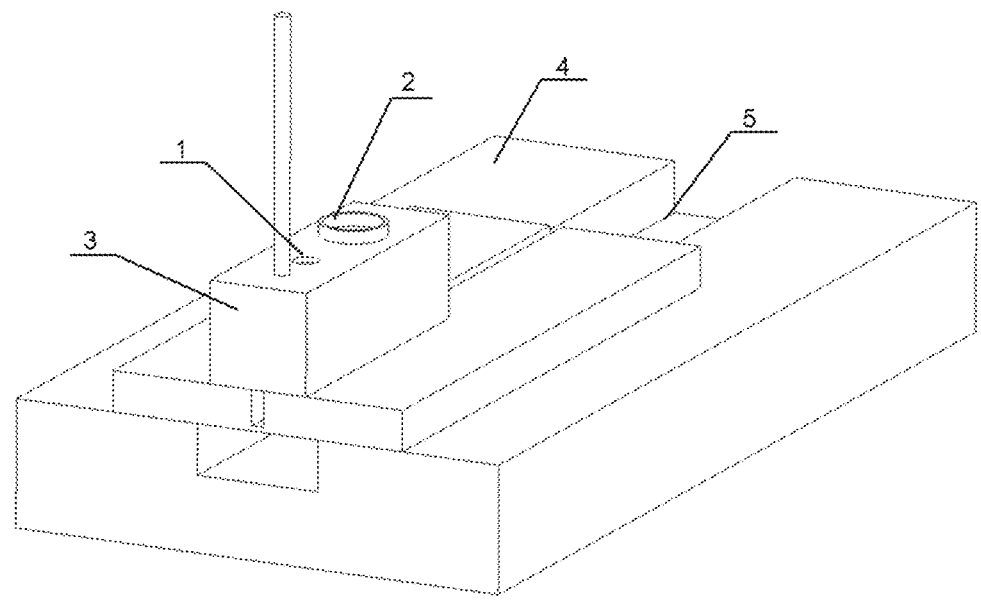
FIG. 1 is a schematic view of a gas protection device of the present invention.

In the above figure, 1 air inlet; 2 welding torch mouth; 3 gas protection device; 4 plate; 5 gas tank; 6 rotating tungsten electrode; 7 inclined surface; 8 blunt platform; 9 external shielding gas system; 10 argon arc welding power source; 11 hardware control circuit; 12 welding trolley; 13 slide bar; 14

PC; 15 GTAW torch; 16 wire feeding device; 17 wire feeding tube; 18 air supply system; 19 rotating motor; 20 conductive system; 21 welding torch shell; 22 central rotating shaft; 23 ceramic nozzle; 24 rotating tungsten electrode; and 25 threaded bolt.

DETAILED DESCRIPTION

In the following some possible embodiments of the invention will be described. Further embodiments may of course be possible within the scope of the claims.

Embodiment 1

The GTAW system is suitable for ultra-narrow gaps, comprising: argon arc welding machine, GTAW torch, welding trolley, wire feeding device and gas protection device.

The GTAW torch includes welding torch shell, rotating motor, central rotating shaft, rotating tungsten electrode, conductive system and air supply system. The rotating motor is connected to the rotating tungsten electrode through the central rotating shaft. The rotating tungsten electrode is a non-axisymmetric tungsten electrode. The conductive system is used to connect to and supply power from the argon arc welding machine. The air supply system is used to provide shielding gas into the welding torch. The rotating motor makes the tungsten electrode rotate periodically.

The GTAW torch is fixed on the welding trolley and moves with it.

The wire feeding device is mechanically connected to the GTAW torch and moves synchronously with the torch, with which users can change the wire feeding angle according to the demands. The automatic wire feeding device matches the welding machine, realizing the delayed wire feeding, the wire drawing in advance and the adjustments of the wire feeding parameters during the welding process.

The gas protection device is a case that is disposed above the workpiece to be welded. There are a welding torch port and a gas inlet on the case, which are used to let the welding torch in and connected to the external shielding gas system.

The air supply system of the GTAW torch adopts the gas protection structure of the ordinary GTAW torch. After the gas enters the welding torch, it fills the air chamber inside the torch first and then it is sprayed through the ceramic nozzle after buffering, which plays a certain restraining effect on the arc under the tungsten electrode and protects the molten pool below the arc.

Preferably, the front end of the GTAW torch is provided with a ceramic nozzle, and the inner wall of the ceramic nozzle is machined with a spiral air guiding gap, which has a certain acceleration effect on the airflow, thus allowing the gas to reach a deeper part of the gap. During welding process, argon gas gently enters the case through the air inlet and forms an argon atmosphere after being dispersed to protect the weld area from oxidation after welding.

Preferably, the welding torch shell of the GTAW torch is made of aluminum alloy material in order to reduce the weight. In addition, the insulating bakelite is used in contact with the clamp to prevent the arc ignition high frequency from affecting the welding torch. The central rotating shaft is made of brass, which can reduce the weight of the welding torch and the axial load effectively. Moreover, the brass material meets the mechanical properties, thermal conductivity and electrical conductivity while providing high economic efficiency. The central rotating shaft is connected with the rotating tungsten electrode with electrically insulated deep gap ball bearings. They can effectively resist the influence of current on the bearing surface and lubricating oil while satisfying the coaxial rotation precision of the central rotating shaft, thus slowing down the corrosion rate of the bearing surface, enhancing the wear resistance of the bearing and prolonging the service life of the bearing.

Embodiment 2

A GTAW system suitable for ultra-narrow gaps has a structure as described in embodiment 1, except that the GTAW torch is fixedly connected to the welding trolley by a threaded bolt by which we can adjust the distance between the welding torch and the workpiece in the horizontal and vertical directions.

Embodiment 3

A GTAW system suitable for ultra-narrow gaps has a structure as described in embodiment 1, except that the end of the central rotating shaft is tightly threaded to rotate the tungsten electrode by a reverse wire. On the one hand, it guarantees good air tightness, on the other hand, it ensures that the thread becomes tighter and tighter during the rotation. During welding, the shielding gas flows through the torch to accelerate the heat dissipation speed of the central rotating shaft, the rotating tungsten electrode, and the conductive copper block.

Embodiment 4

Figure 2:
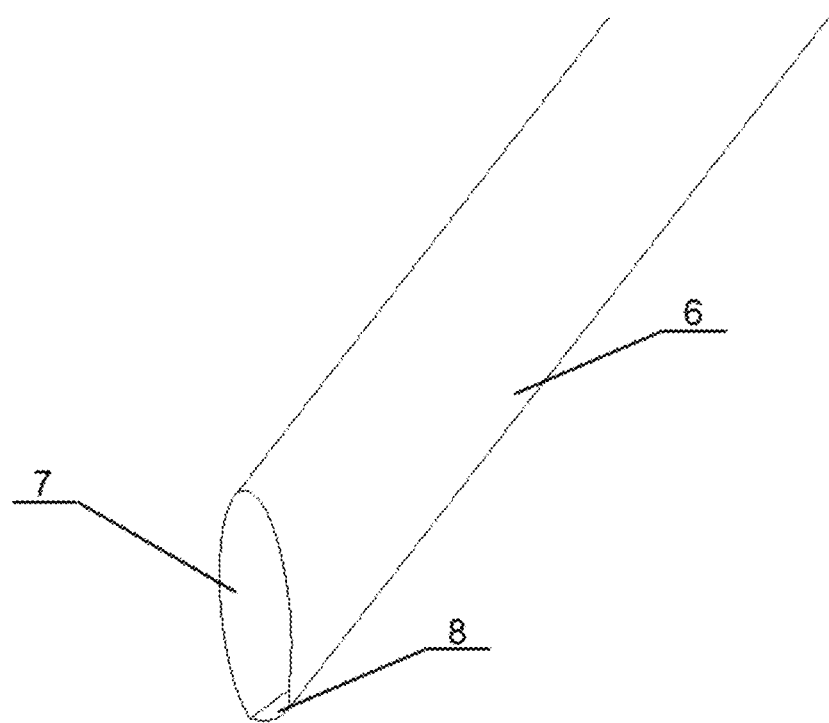
FIG. 2 is a schematic view of the non-axisymmetric tungsten electrode of the present invention.
Figure 3:
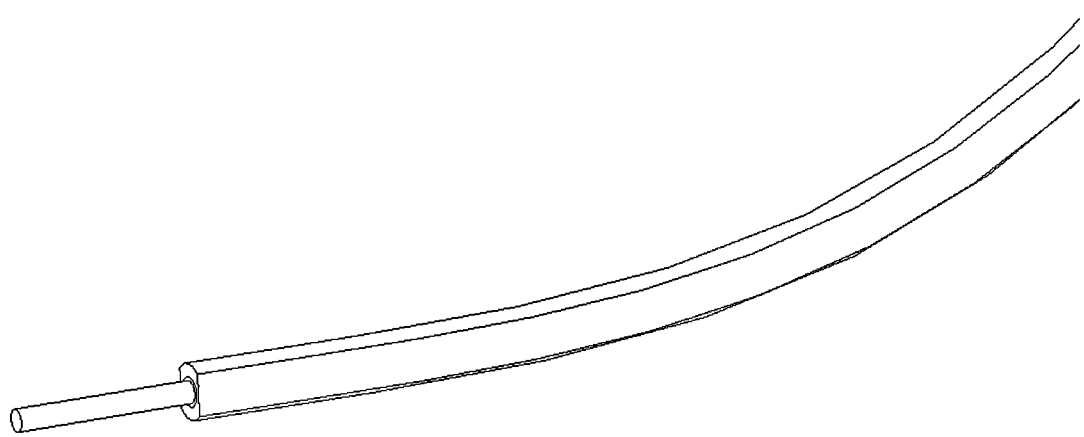
FIG. 3 is a schematic view of the wire feeding tube of the present invention.
Figure 4:
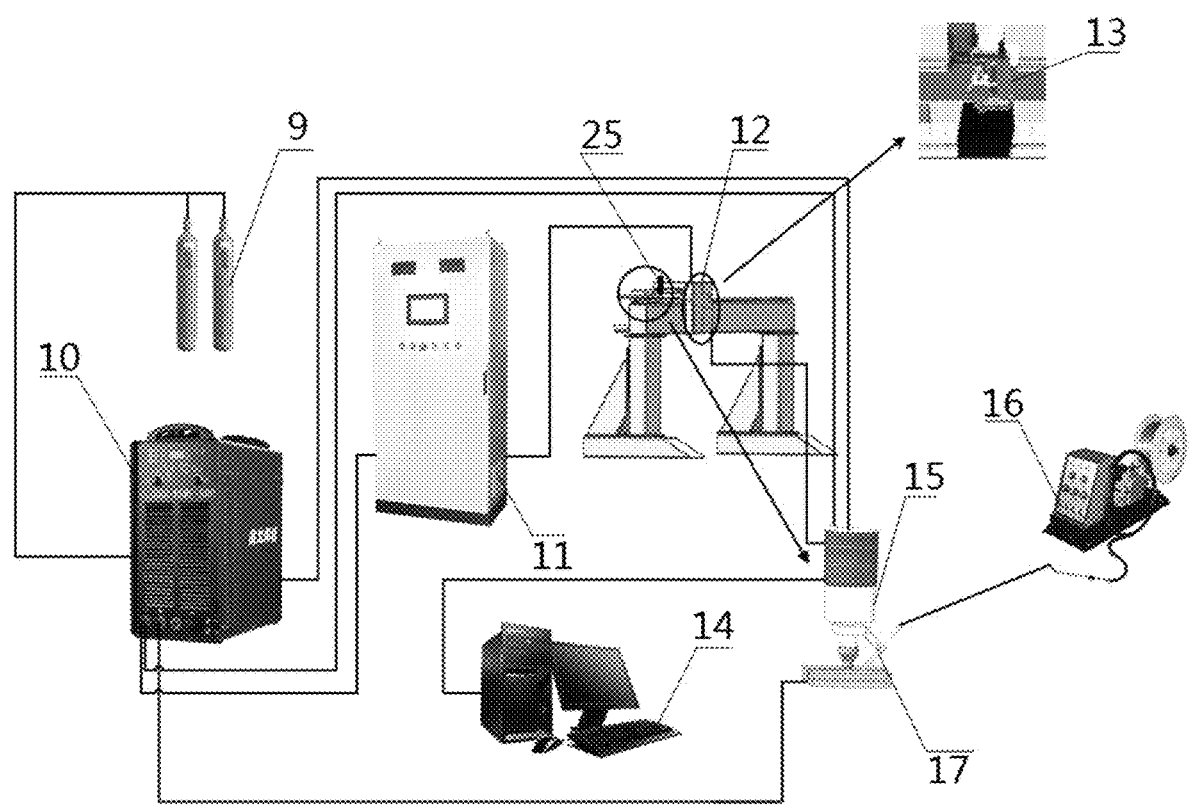
FIG. 4 is a schematic diagram of GTAW welding system of the present invention.
Figure 5:
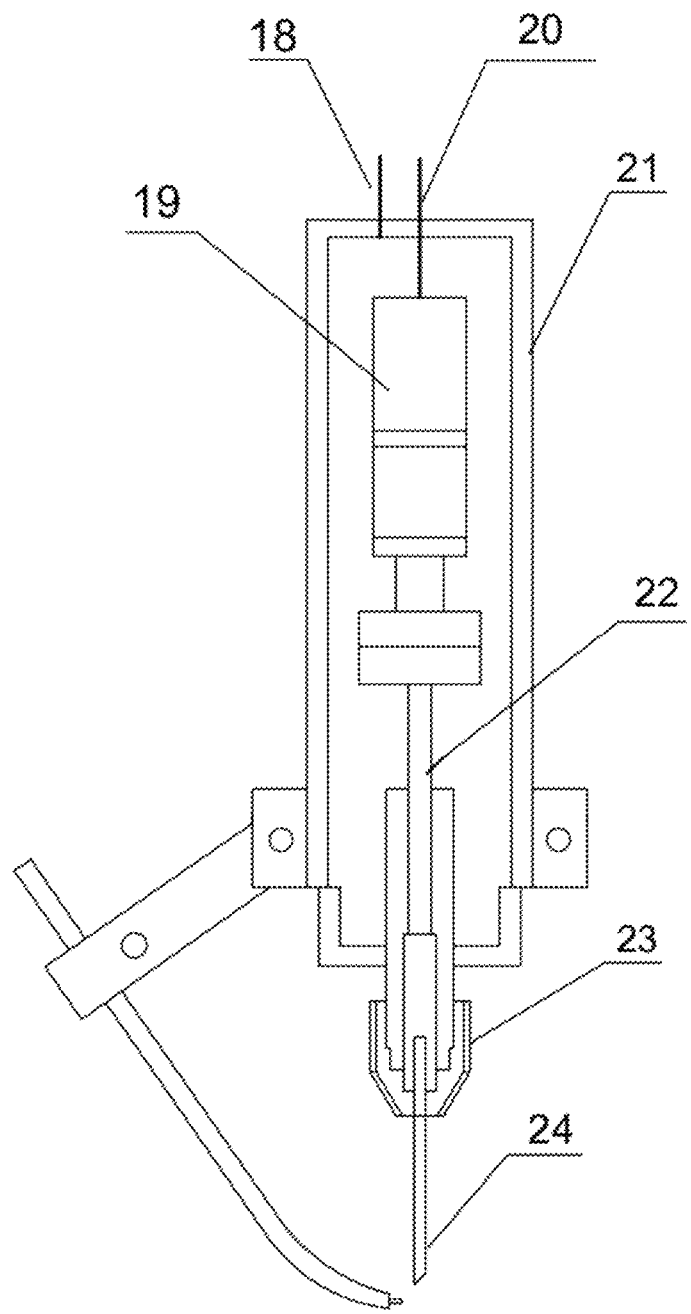
FIG. 5 is schematic diagram of the GTAW welding torch of the present invention.

A GTAW system suitable for ultra-narrow gaps has a structure as described in embodiment 1, except that the bottom end of the rotating tungsten electrode is provided with an inclined surface, and the tip end of the rotating tungsten electrode is provided with a blunt surface platform, as shown in the FIG. 2. The angle between the inclined surface and the central axis of the rotating tungsten electrode pole is formed. As the tungsten electrode rotates in the narrow gap periodically, the distance between the tungsten electrode tip and the sidewalls of the two sides changes periodically. According to the principle of minimum voltage, as the tungsten electrode rotates periodically, the arc sways in the narrow gap so that the welding wire and the sidewall are effectively melted. The tungsten electrode tip is processed out of the platform, which can effectively improve the stability of the arc. On the other hand, compared with the ordinary tungsten electrode, the platform can effectively improve the burning of the tungsten electrode during use.

Embodiment 5

A GTAW system suitable for ultra-narrow gaps has a structure as described in embodiment 4, except that the angle between the inclined surface and the central axis of the rotating tungsten electrode is 45°. According to the comparison test, when the tilt angle is too small, the arc shape is similar to that of the ordinary tungsten electrode, causing the sidewall on both sides of the narrow gap difficult to be effectively heated and poorly fused. When the tilt angle is too large, the arc length is too long and the arc stiffness is not enough, which is not conducive to the stable combustion of the arc. Generally speaking, it is best when the tip is at a 450 tilt angle.

Embodiment 6

A GTAW system suitable for ultra-narrow gaps has a structure as described in embodiment 1, except that the rotating electrical machine is coupled to the central rotating shaft through a coupling.

Embodiment 7

A GTAW system suitable for ultra-narrow gaps, the structure of which is as described in embodiment 5, except that the welding system further includes a PC and a hardware control circuit, and the rotating electrical machine is connected to the PC, and is controlled by the PC and the hardware. The circuit regulates the motor pulse frequency to control the rotation of the rotating tungsten electrode.

The pulse frequency of the stepping motor is controlled by the PC and the control circuit to control the acceleration and deceleration of the stepping motor. Each time a pulse is generated, the initial value of the timer is de creased by a value, the pulse period is decreased, the pulse frequency is increased, and the motor is in the acceleration phase. When entering the deceleration phase, the initial value of the timer is increased for each pulse generated. For one value, the pulse period increases and the pulse frequency decreases. By controlling the motor to output a periodic trigonometric waveform speed to control the non-uniform rotation of the tungsten electrode in the gap, the speed of the tungsten electrode tip is the slowest when it rotates to the sidewalls of the two sides, and the speed is the fastest when it rotates to the middle of the gap. This method increases the residence time of the arc on both sidewalls, which allows more heat in one arc swing period to heat the sidewalls.

Embodiment 8

A GTAW system suitable for ultra-narrow gaps has a structure as described in embodiment 1, except that the case is a hollow square case, and the welding torch mouth and the gas passage are provided on the top surface of the case.

Embodiment 9

A GTAW system suitable for ultra-narrow gaps has the structure as described in embodiment 1, except that one end of the housing is connected to the GTAW torch by a slide bar. The housing can be adjusted along the slider and moved synchronously with the torch.

Embodiment 10

A GTAW system suitable for ultra-narrow gaps, the structure of which is as described in embodiment 7, except that a pad is arranged under the workpiece to be welded, and the pad is provided with a gas gap along the weld, and one end of the gas gap is connected with the external protective gas system. In addition to the gas protection device above the welded workpiece, the protective gas is also introduced under the workpiece to be welded. On the one hand, an argon atmosphere is formed to protect the back of the workpiece, and on the other hand, the heat dissipation and cooling of the weldment can be accelerated, and the welding efficiency is improved. The back plate is made of brass.

Embodiment 11

A GTAW system suitable for ultra-narrow gaps has a structure as described in embodiment 10, except that the wire feeding device comprises a wire feeding tube which is square in shape. Different from the conventional circular feeding tube, on the one hand, this design can reduce the size of the wire feeding tube in the direction of the vertical narrow gap and facilitate the movement of the wire feeding tube in the gap. On the other hand, it can facilitate the accurate feeding of the wire to the tungsten electrode, which prevents the wire from being inaccurately positioned in the ultra-narrow gap due to the axial rotation of the wire feeding tube during the adjustment. Due to the gas protection device, the wire feeding tube needs to be bent into a certain curve to feed the wire into the gap so that the fed wire is also bent into a certain curve. Accurately positioning the wire feed tube in the middle of the gap, keeping the same surface with the tungsten electrode can improve the stability of the welding process and the formation of the weld.

Embodiment 12

A welding method using the GTAW system suitable for ultra-narrow gaps as described in embodiment 11, the present example is welding a STH490 steel having a thickness of 16 mm, an ultra-narrow U-shaped gap width of 5 mm, and a JQMG70S-6 wire having a diameter of 1.2 mm. The carbon steel welding wire, the wire feeding tube and the torch are mechanically connected, processed into a certain curve and fed into the ultra-narrow gap, and the mechanical connection can be adjusted according to the need to change the direction and position of the wire feeding tube, including the following steps:

(1) Pretreat the workpiece to be welded, U-shaped gap with a width of 5 mm and a depth of 14 mm is processed by wire cutting on the 16 mm SHT490 steel, the bottom joint is a round corner with a radius of 1 mm, and the back is left with a 2 mm blunt edge. Prior to the welding operation, the oil and rust in the steel plate and the gap are cleaned by angle grinder, sandpaper and alcohol. After the cleaning is completed, the steel plate is fixed by a clamp, and a predeformation angle of 4-5° is set to offset the deformation of the workpiece during the welding process.

(2) Turn on the welding trolley. When the rotating tungsten electrode moves into the gap of the workpiece, adjust the position of the rotating tungsten electrode to ensure that the rotating tungsten electrode is centered in the gap in the horizontal direction, and the 2.4 mm tungsten electrode tip is 2.6 mm away from the bottom gap in the vertical direction. The wire feeding tube extends into the gap from the front end of the gas protection device. And the horizontal distance between the wire feeding tube and the tungsten electrode is 5 mm, and the wire protruding from the wire feeding tube is located directly below the tungsten electrode, and in the vertical direction, the distance from the tip of the tungsten electrode to the wire is 2.5 mm. The welding machine is adjusted to the constant current mode, the welding current is adjusted to 200 A. The gas is adjusted to 40 L/min, which is delayed in wire feeding and drawn in advance. The movement speed of the welding trolley is adjusted to 100 mm/min and the wire feeding speed of the wire feeding mechanism is adjusted to 1250 mm/min. Delay the wire feeding, and draw the wire in advance to prevent the wire from being poked into the molten pool during the welding process. Adjust the PC to set the average motor speed of 5 rps.

(3) After adjusting the parameters, control the welding trolley to move out of the gap, turn on the rotating motor to make rotating tungsten electrode start to rotate. Turn on the welding machine when the motion moves to the edge of the gap, and the high frequency arc is ignited. The wire feeding device starts wire feeding.

After the first layer of welding is completed, the argon gas delayed in the gas protection device is used for cooling, and then it is cooled to a temperature of 50° C. by using the shielding gas. Then repeat step (2) for the next layer of welding. As the number of weld layers increases, the welding current is gradually increased to 230 A, the gas flow is reduced to 20 L/min, and the other parameters remain unchanged.

The rotating frequency of the rotating motor is controlled by the PC and the hardware control circuit to control the non-uniform rotation of the rotating tungsten electrode so that the heating time of the rotating tungsten electrode on the sidewall is half of one cycle of the rotation. A non-uniform swing of the arc is achieved. During the rotation of the tungsten electrode, arc is burning on both sidewalls for about one-third of the stage, and arc heats the wire and the molten pool in the middle of the gap for about the two-thirds of the stage. By controlling the non-uniform rotation of the tungsten electrode, the speed of the tungsten electrode tip decreases when it rotates to the sidewall of the two sides, and the speed increases when the middle of the gap is turned, so that the sidewall heating time changes from the original one-third of cycle to the current half of cycle during one rotation.

Moreover, the motor control circuit can be adjusted according to the needs of different gap sizes to adjust the ratio of the speed of the rotating speed, thereby adjusting the proportion of the arc heating sidewall time. On the one hand, the heat input can be effectively reduced, and on the other hand, the sidewall fusion is more reliable.

In this example, the arc can rotates periodically in the ultra-narrow gap. The welding wire, the molten pool and the sidewall are periodically heated, and the arc has a stirring effect on the molten pool. The welding process is stable, the arc combustion is stable, and the welding of 16 mm SHT490 steel can be completed in five layers, of which the surface is flat and bright, showing dense fish scale features. The end face of the weld is concave, and no defects are formed by incomplete fusion of the sidewall.

Embodiment 13

A welding method for a GTAW system for ultra-narrow gaps, the steps are as shown in embodiment 12, except that in step (2), the size of the rotating tungsten electrode and the position of the tungsten electrode are adjusted according to the gap size. In the direction perpendicular to the weld, the tungsten electrode is located in the middle of the gap, which prevents the tungsten electrode from producing a large deviation when it moves to the sidewalls of the two sides.

A 3.0 mm tungsten electrode with a tip which is processed with a 45° slope and has a blunt platform is applied to the 6 mm gap. The tungsten electrode tip is 3.0 mm from the bottom in the vertical direction. Adjust the motor to control the average rotational speed of the tungsten electrode to 4 rps.

Embodiment 14

A welding method for a GTAW system suitable for ultra-narrow gaps, the steps are as shown in the embodiment 12, except that in the step (2), a 2.0 mm tungsten electrode with a tip which is processed with a 45° slope and has a blunt platform is applied to the 4 mm gap. The tungsten electrode tip is 2.0 mm from the bottom in the vertical direction. Adjust the motor to control the average rotational speed of the tungsten electrode to 6 rps.

Embodiment 15

A welding method for a GTAW system for ultra-narrow gaps, the steps are as shown in embodiment 12, except that in step (2), the tip of the rotating tungsten electrode has a vertical distance of 2 mm from the welding wire to ensure the stability of the welding process and the uniform formation of the weld.

Embodiment 16

A welding method for a GTAW system for ultra-narrow gaps, the steps are as shown in embodiment 12, except that in step (2), the tip of the rotating tungsten electrode has a vertical distance of 3 mm from the welding wire to ensure the stability of the welding process and the uniform formation of the weld.

Embodiment 17

A welding method for a GTAW system suitable for ultra-narrow gaps, the steps are as shown in embodiment 12, except that in the step (3), after one layer of welding is completed, the weld is cooled by the shielding gas to an interlayer temperature of 45° C. Then repeat step (2) for the next layer of welding.

Embodiment 18

A welding method for a GTAW system suitable for ultra-narrow gaps, the steps are as shown in embodiment 12, except that in the step (3), after one layer of welding is completed, the weld is cooled by the shielding gas to an interlayer temperature of 55° C. Then repeat step (2) for the next layer of welding.

Embodiment 19

A welding method of a GTAW system suitable for ultra-narrow gaps, the steps are as shown in embodiment 12, except that in the step (3), the wire feeding speed is 1000 mm/min, and the welding speed is 80 mm/min.

What is claimed is:
1. A GTAW system suitable for ultra-narrow gaps, comprising: an argon arc welding machine, a GTAW torch, a welding trolley, a wire feeding device, and a gas protection device;
   the GTAW torch includes welding torch shell, rotating motor, central rotating shaft, rotating tungsten electrode, conductive system and air supply system; the rotating motor is connected to the rotating tungsten electrode through the central rotating shaft; the rotating tungsten electrode is a non-axisymmetric tungsten electrode; the conductive system is used to connect with the welding machine and provide power; the air supply system is used to provide shielding gas into the welding torch;
   the GTAW torch is fixed on the welding trolley, and the welding trolley drives the GTAW torch to move;
   the wire feeder is mechanically coupled to the GTAW torch;
   the gas protection device is a case, and the case is disposed above a workpiece to be welded, the case is provided with a welding torch port and an air inlet; the GTAW torch is inserted into the welding torch port, and the case is connected to the external shielding gas system through the air inlet.

2. The GTAW system for ultra-narrow gap according to claim 1, wherein the GTAW torch is fixedly connected to the welding trolley by a threaded bolt; the end of the central rotating shaft is threaded to rotate the tungsten electrode with a wire in a reverse direction; the shaft is connected to the center rotating shaft;

the front end of the GTAW torch is provided with a ceramic nozzle, and the inner wall of the ceramic nozzle is provided with a spiral gas-guiding groove.

3. The GTAW system for ultra-narrow gap according to claim 1, wherein the bottom end of the rotating tungsten electrode is provided with an inclined surface.

4. The GTAW system for ultra-narrow gap according to claim 1, wherein the welding system further comprises a PC and a hardware control circuit, and the rotating motor is connected to the PC, and the pulse frequency of the motor is regulated by the PC and the hardware control circuit to control the rotation of the rotating tungsten electrode.

5. The GTAW system for ultra-narrow gap according to claim 1, wherein the housing is a hollow square housing, and the welding torch mouth and the gas passage are disposed on the top surface of the housing.

6. The GTAW system for ultra-narrow gap according to claim 1, wherein a pad is arranged under the workpiece to be welded, the pad is provided with a gas gap along the weld, and one end of the gas gap is connected to the external protective gas system.

7. A welding method for a GTAW system suitable for ultra-narrow gaps according to claim 1, characterized in that the steps are as follows:

(1) pretreat the workpiece to be welded;

(2) turn on the welding trolley, when the rotating tungsten electrode moves into the gap of the workpiece, adjust the position of the rotating tungsten electrode to ensure that it is centered in the horizontal direction in the gap; the wire feeding tube extends from the front end of the gas protection device into the gap, and the wire protruding from the wire feeding tube is located directly below the tungsten electrode; turn on the welding machine, adjust the welding machine to a constant current mode, deliver air in advance, and delay the gas; then adjust the movement speed of the welding trolley, adjust the wire feeding speed of the setting wire feeding machine, delay the wire feeding, and draw the wire in advance; adjust the PC and set the average motor speed;

(3) after adjusting the parameters, the welding trolley is controlled to move out of the gap, and the rotating motor is turned on to make the rotating tungsten electrode start to rotate; when the welding trolley is moved to the edge of the gap, turn on the welding machine, the high frequency arc is ignited, and the wire feeding tube is used for wire feeding;

after the first layer of welding is completed, the argon gas delayed in the gas protection device is used for cooling, and then the step (2) is repeated for the next layer of welding.

8. The welding method for an ultra-narrow gap GTAW system according to claim 7, wherein in step (2), the size of the rotating tungsten electrode and the position of the tungsten electrode are adjusted according to the size of the gap; in the horizontal direction of the vertical weld, the tungsten electrode is located in the middle of the gap;

the height of the tungsten electrode from the bottom gap is adjusted according to the gap size; to weld a 6 mm gap, a 3.0 mm tungsten electrode is used, the tip is processed with a 45° inclined surface and has a blunt platform, and the tungsten electrode tip is at a height from the bottom of 3.0 mm; to weld a 5 mm clearance gap, a 2.4 mm tungsten electrode is used, the tip is processed with a 45° inclined surface and has a blunt platform, the tungsten electrode tip is 2.6 mm from the bottom; to weld a 4 mm gap, 2.0 mm tungsten electrode is used, and the tip is processed with a 45° slope and has a blunt platform with a tungsten electrode tip that is 2.0 mm from the bottom.

9. The welding method for a GTAW system for ultra-narrow gap according to claim 7, wherein in the step (3), after one layer of welding is completed, the weld is cooled by the shielding gas to an interlayer temperature of 45-55° C.; then repeat the step (2) for the next layer of welding.

10. The welding method for a GTAW system for ultra-narrow gap according to claim 7, wherein in the step (3), the rotating frequency of the rotating motor is controlled by a PC and a hardware control circuit to control the non-uniform rotating tungsten electrode; the heating time of the rotating tungsten electrode on the sidewall is half of one cycle of the rotation.

11. The GTAW system for ultra-narrow gap according to claim 3, wherein the tip of the inclined surface of the tungsten electrode is provided with a blunt platform; the angle between the inclined surface and the central shaft of the tungsten electrode is 45°.

12. The GTAW system for ultra-narrow gap according to claim 4, wherein the wire feeding device comprises a wire feeding tube, and the wire feeding tube is a square tube.

13. The GTAW system for ultra-narrow gap according to claim 5, wherein one end of the housing is connected to the GTAW torch by a slide bar.

14. The welding method for an ultra-narrow gap GTAW system according to claim 8, wherein in step (2), the horizontal distance between the wire feeding tube and the tungsten electrode is 5 mm, and the vertical distance between the wire and the tip end of the tungsten electrode is 2-3 mm.

15. The welding method for an ultra-narrow gap GTAW system according to claim 14, wherein in step (2), to weld a gap of 6 mm, the average rotational speed of the tungsten electrode is adjusted to 4 rps; to weld a 5 mm one, the average rotational speed of the tungsten electrode is controlled to be 5 rps; to weld a 4 mm one, the average rotational speed of the controlled tungsten electrode is 6 rps.

16. The welding method for an ultra-narrow gap GTAW system according to claim 9, wherein in the step (3), after the welding of one layer is completed, the weld is cooled by the shielding gas to an interlayer temperature of 50° C., and then the step (2) is repeated for the next layer of welding.

17. The welding method for an ultra-narrow gap GTAW system according to claim 16, wherein in the step (3), in the next welding process, the welding current of the next layer is increased compared with the welding current of the previous layer, and the flow of the shielding gas of the next layer is smaller than that of the previous one.

18. The welding method for an ultra-narrow gap GTAW system according to claim 10, wherein in step (3), there is a matching relationship between the wire feeding speed, the welding speed and the heat input; the wire feeding speed can be adjusted from 1000 mm/min to 1250 mm/min according to the needs, and the welding speed can be adjusted from 80 mm/min to 100 mm/min; the welding current and welding speed are adjusted to control the welding heat input in the interval of from 2.0 kJ/mm to 2.5 kJ/mm.

* * * * *